United States Patent
Gao et al.

(10) Patent No.: US 11,070,428 B2
(45) Date of Patent: Jul. 20, 2021

(54) SYSTEM AND METHOD FOR EXCHANGING CONFIGURATION INFORMATION BETWEEN TWO NODES IN A WIRELESS NETWORK

(71) Applicant: ZTE CORPORATION, Guangdong (CN)

(72) Inventors: Yin Gao, Guangdong (CN); He Huang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/460,727

(22) Filed: Jul. 2, 2019

(65) Prior Publication Data

US 2019/0327133 A1 Oct. 24, 2019

Related U.S. Application Data

(63) Continuation of application No. PCT/CN2017/088440, filed on Jun. 15, 2017.

(51) Int. Cl.
| | | |
|---|---|---|
| H04L 12/24 | (2006.01) | |
| H04W 72/04 | (2009.01) | |
| H04W 84/04 | (2009.01) | |
| H04W 88/08 | (2009.01) | |

(52) U.S. Cl.
CPC ........... *H04L 41/082* (2013.01); *H04L 41/06* (2013.01); *H04W 72/04* (2013.01); *H04W 84/042* (2013.01); *H04W 88/08* (2013.01)

(58) Field of Classification Search
CPC ...... H04L 41/082; H04L 41/06; H04W 72/04; H04W 84/042; H04W 88/08; H04W 88/085; H04W 48/16; H04W 24/04
See application file for complete search history.

(56) References Cited

U.S. PATENT DOCUMENTS

| | | |
|---|---|---|
| 2009/0185514 A1 | 7/2009 | Chandra et al. |
| 2013/0070641 A1 | 3/2013 | Meier et al. |

(Continued)

FOREIGN PATENT DOCUMENTS

| | | |
|---|---|---|
| CN | 101347005 A | 1/2009 |
| CN | 101926128 A | 12/2010 |

(Continued)

OTHER PUBLICATIONS

International Search Report dated Mar. 15, 2018 in corresponding International Application No. PCT/CN2017/088440.

(Continued)

*Primary Examiner* — Jackie Zuniga Abad
(74) *Attorney, Agent, or Firm* — Duane Morris LLP

(57) ABSTRACT

The present disclosure relates to a method and system for managing and exchanging configuration information between two nodes in a wireless network. In one embodiment, a method implemented on a first node is disclosed. The method comprises: generating a first message that comprises first configuration information associated with the first node; and transmitting the first message to a second node for exchanging configuration information with the second node, wherein the first node and the second node cooperate to serve at least one cell in a wireless network as a base station.

8 Claims, 11 Drawing Sheets

(56) References Cited

U.S. PATENT DOCUMENTS

| | | | |
|---|---|---|---|
| 2015/0215020 A1* | 7/2015 | Kim | H04L 5/0032 370/230 |
| 2018/0270713 A1* | 9/2018 | Park | H04L 5/0053 |
| 2018/0337846 A1* | 11/2018 | Lee | H04W 28/085 |
| 2019/0349774 A1* | 11/2019 | Lou | H04W 16/10 |

FOREIGN PATENT DOCUMENTS

| | | |
|---|---|---|
| CN | 105101273 A | 11/2015 |
| WO | 2011/126313 A2 | 10/2011 |

OTHER PUBLICATIONS

Samsung, et al., "F1 interface setup and the delivery of gNB-DU capability", 3GPP TSG-RAN WG3 Meeting #96, R3-171703, Hangzhou, P.R. China, May 15-19, 2017, 4 pages.

Huawei, (TP for NR BL for 38.473): on supported PLMN over F1, 3GPP TSG-RAN WG3 #101, R3-184911, Gothenburg, Sweden, Aug. 20-24, 2018, 15 pages.

ZTE, TP for CU/DU ID and conception in TS38.401, 3GPP TSG RAN WG3 Meeting #96, R3-171660, Hangzhou, P.R. Cina, May 15-19, 2017, 2 pages.

"3rd Generation Partnership Project; Technical Specification Group Radio Access Network; NG-RAN; F1 application protocol (F1AP) (Release 15)", 3GPP Draft; TS 38.473 V010, 3rd Generation Partnership Project (3GPP), Mobile Competence Centre; 650, Route Des Lucioles ; F-06921 Sophia-Antipolis Cedex; France, Jun. 2, 2017 (Jun. 2, 2017), XP051286184, 19 pages.

Huawei et al: "TP on fundamental F1 AP procedures", 3GPP Draft; R3-172000 TP on Fundamental F1 AP Procedures to 38.473, 3rd Generation Partnership Project (3GPP), Mobile Competence Centre; 650, Route Des Lucioles; F-06921 Sophia-Antipolis Cedex; FRA, vol. RAN WG3, No. Hangzhou, China; May 15, 2017-May 19, 2017, May 19, 2017 (May 19, 2017), XP051286150, 8 pages.

\* cited by examiner

SYSTEM AND METHOD FOR EXCHANGING CONFIGURATION INFORMATION BETWEEN TWO NODES IN A WIRELESS NETWORK

CROSS-REFERENCE TO RELATED APPLICATION

The present application claims priority to PCT international application PCT/CN2017/088440, entitled "SYSTEM AND METHOD FOR EXCHANGING CONFIGURATION INFORMATION BETWEEN TWO NODES IN A WIRELESS NETWORK," filed on Jun. 15, 2017, which is expressly incorporated by reference herein in its entirety.

TECHNICAL FIELD

The disclosure relates generally to wireless communications and, more particularly, to systems and methods for managing and exchanging configuration information between two nodes in a wireless network.

BACKGROUND

Due to mass connection and higher rate requirements from users in 5G mobile communications, there is a big challenge to the transmission capacity of the fronthaul interface CPRI (Common Public Radio Interface) between BBU (Baseband Unit) and RRU (Radio Remote Unit) in LTE. Because CPRI interface transmits an I/Q (real/imaginary) signal that has been processed by physical layer coding, CPRI interface has a tighter requirement on the transmission delay and bandwidth. If the 5G air interface rate is increased to tens of Gbps, the traffic demand of CPRI interface will rise to Tbps level, which will give a big pressure on the cost and difficulty of network deployment. Therefore, in 5G, there is a need to redefine divisions of the fronthaul interface, in consideration of transmission capacity, transmission delay, easiness of deployment, and other aspects. For example, taking into account the non-ideal fronthaul transmission, when dividing a base station (BS), one can put the delay-insensitive network functions in a first network element, such as a Centralized Unit (CU), and put the delay-sensitive network functions in a second network element, such as a Distributed Unit (DU). There is an ideal and/or non-ideal fronthaul transmission between the first and second network elements.

Because CU and DU need a fronthaul interface to communicate with each other, there is a need to perform CU-DU interface establishment by exchanging and updating configuration information between CU and DU. In addition, because one CU manages one or more DUs, there is also a need to perform DU load information management.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method implemented on a first node is disclosed. The method comprises: generating a first message that comprises first configuration information associated with the first node; and transmitting the first message to a second node for exchanging configuration information with the second node, wherein the first node and the second node cooperate to serve one or more cells in a wireless network as a base station.

In a further embodiment, a method implemented on a first node is disclosed. The method comprises: receiving a first message from a second node for exchanging configuration information with the second node, wherein the first message comprises first configuration information associated with the second node, and wherein the first node and the second node cooperate to serve one or more cells in a wireless network as a base station.

In another embodiment, a first node is disclosed. The first node comprises: a configuration generator configured to generate a first message that comprises first configuration information associated with the first node; and a transmitter configured to transmit the first message to a second node for exchanging configuration information with the second node, wherein the first node and the second node cooperate to serve one or more cells in a wireless network as a base station.

In yet another embodiment, a first node is disclosed. The first node comprises: a receiver configured to receive a first message from a second node for exchanging configuration information with the second node, wherein the first message comprises first configuration information associated with the second node, and wherein the first node and the second node cooperate to serve one or more cells in a wireless network as a base station.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The present teaching discloses a method to establish an interface between a first network element and a second network element, and update or maintain the interface configuration, to ensure that the interface is initially established and its configuration is updated under a CU-DU separation architecture. In addition, the present teaching discloses a method for reporting and monitoring resource status between the first network element and the second network element, such that the CU can fully understand the resource usage of its connected DUs and make wise decisions, like a radio resource management (RRM) decision, based on the DU resource status.

Figure 1:
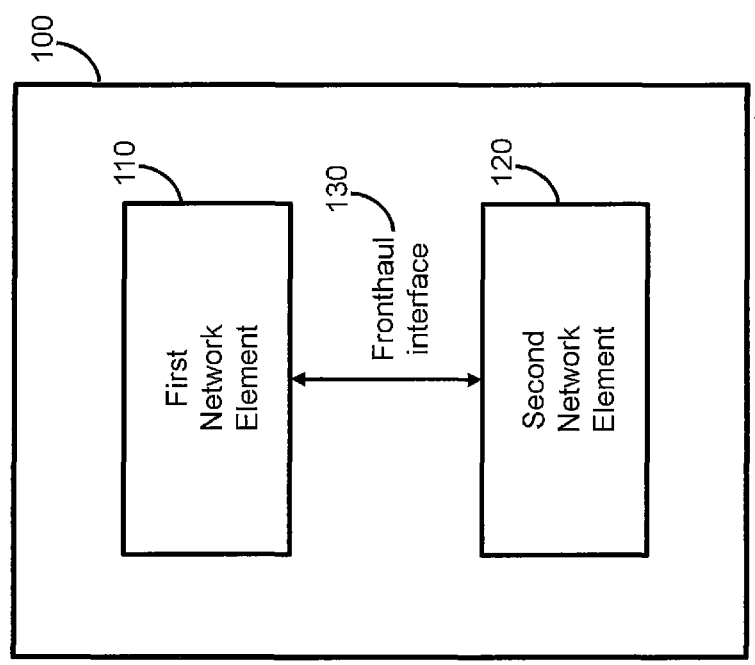
FIG. 1 illustrates a fronthaul interface between a first network element and a second network element of a base station, in accordance with some embodiments of the present disclosure.

In a 5G new radio (NR) network, a base station is separated into a first network element (a centralized network element CU) and a second network element (a distributed network element DU). FIG. 1 illustrates a fronthaul interface between a first network element and a second network element of a base station (BS) 100, in accordance with some embodiments of the present disclosure. As shown in FIG. 1, the BS 100 is divided into a first network element 110 and a second network element 120. The first network element 110 and the second network element 120 communicate through a fronthaul interface 130, where the fronthaul can be an ideal fronthaul or a non-ideal fronthaul according to different delays. An ideal fronthaul transmission has a relatively small delay, such as tens to hundreds of microseconds. A non-ideal fronthaul transmission has a relatively large delay, such as milliseconds. Due to the differences between the ideal and non-ideal fronthaul transmission, there are different ways to divide different network functions into the first network element 110 and the second network element 120.

In one embodiment, the first network element 110 is a CU and the second network element 120 is a DU, wherein the CU 110 and the DU 120 can cooperate to serve one or more cells as a base station. One CU may control a plurality of DUs at the same time, while a DU can be associated with one cell or a cell list that includes one or more cells. By controlling a number of DUs with a CU, a wireless system can have a baseband centralized processing and provide distributed remote services to users in a cloud architecture.

In a CU-DU separation network architecture, delay-insensitive network functions may be placed in the CU; and delay-sensitive network functions may be placed in the DU. Accordingly, a CU and a DU may have different hardware and structure for implementing the different network functions.

For example, a first protocol entity (e.g., a radio resource control (RRC) entity) is located at the CU. The first protocol entity generates control signals, maintains the establishment, modification, and/or release of the radio bearer, and maintains updated parameters of a second protocol entity, a third protocol entity, a fourth protocol entity, and the physical (PHY) layer of the base station. The second protocol entity has a similar or enhanced function compared to the PDCP (Packet Data Convergence Protocol) function of an LTE system. The third protocol entity has a similar or enhanced function compared to the RLC (Radio Link Control) function of an LTE system. The fourth protocol entity has a similar or enhanced function compared to the MAC (Medium Access Control) function of an LTE system. The DU comprises at least one of: the second protocol entity, the third protocol entity, the fourth protocol entity, the physical layer, and the radio frequency (RF) unit of the base station.

Figure 2:
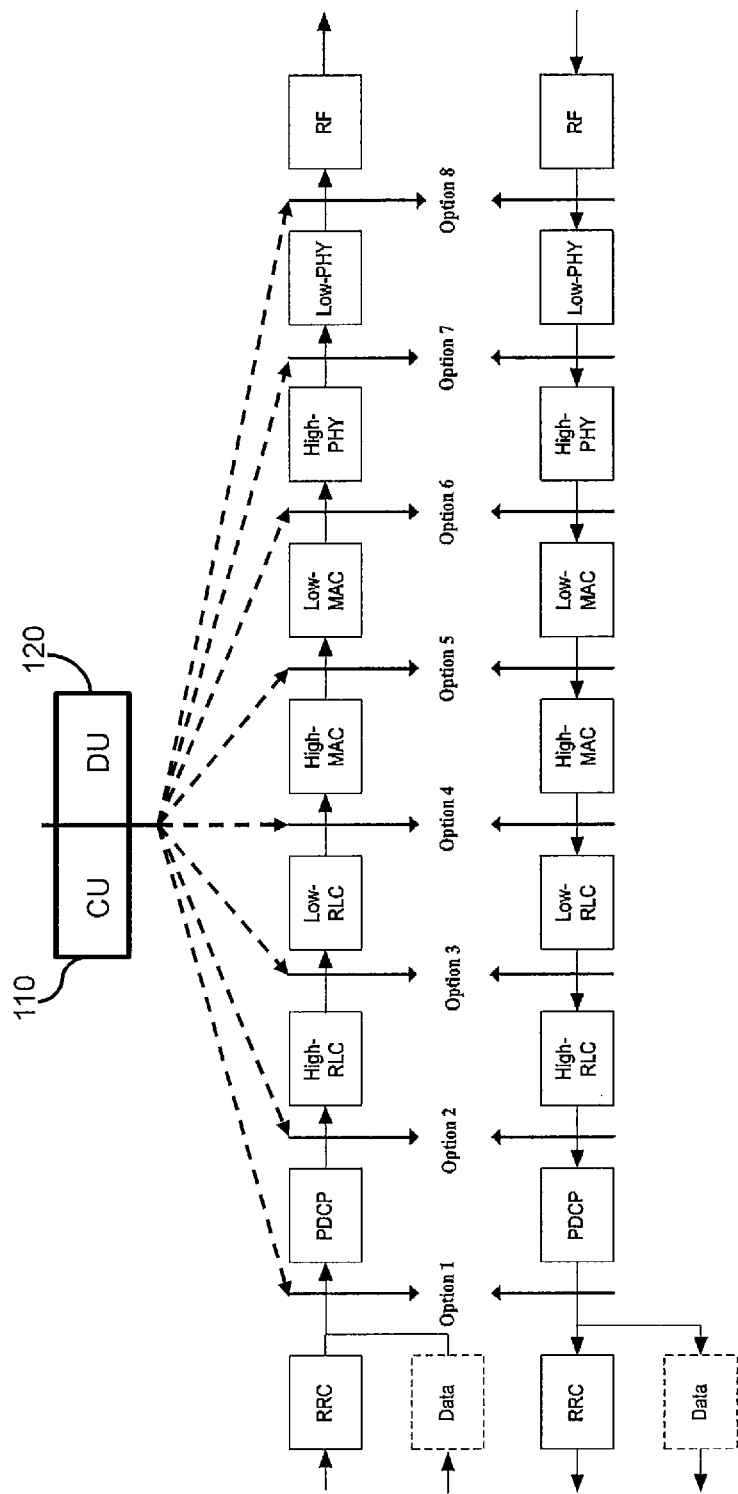
FIG. 2 illustrates exemplary functional divisions between the first network element and the second network element, in accordance with some embodiments of the present disclosure.

FIG. 2 illustrates exemplary functional divisions between the first network element and the second network element, i.e. between the CU 110 and the DU 120, in accordance with some embodiments of the present disclosure. Specifically, FIG. 2 illustrates eight possible functional division options between the CU 110 and the DU 120.

Option 1 (RRC/PDCP separation): The functional separation of this option is similar to the 1A structure in a dual connection (DC). RRC is located within CU; PDCP, RLC, MAC, PHY and RF functions are located in DU. That is, the entire UP is located in DU.

Option 2 (PDCP/RLC separation): The functional separation of this option is similar to the 3C structure in a dual connection (DC). RRC and PDCP are located within CU; RLC, MAC, PHY and RF functions are located in DU.

Option 3 (RLC high-level/low-level separation): The low-level RLC (partial function of the RLC), MAC, PHY, and RF are located within DU; RRC, PDCP and high-level RLC (partial function of the RLC) functions are located in the CU.

Option 4 (RLC-MAC separation): MAC, PHY and RF parts are located within DU; PDCP and RLC functions are located in the CU.

Option 5 (MAC internal separation): Some of the MAC functions (such as HARQ), PHY and RF are located in DU; the other upper level functions are located in the CU.

Option 6 (MAC-PHY): PHY and RF parts are located in DU; RRC, PDCP, RLC and MAC functions are located in the CU.

Option 7 (PHY internal separation): Some of the PHY functions and RF are located in DU; the other upper function is located in the CU.

Option 8 (PHY-RF separation): The RF part is located within the DU; and the other upper level functions are located in the CU.

In one embodiment, when a standard supports two or more options for dividing network functions into CU and DU, the wireless system can adaptively switch between the supported options during wireless communications.

Figure 3:
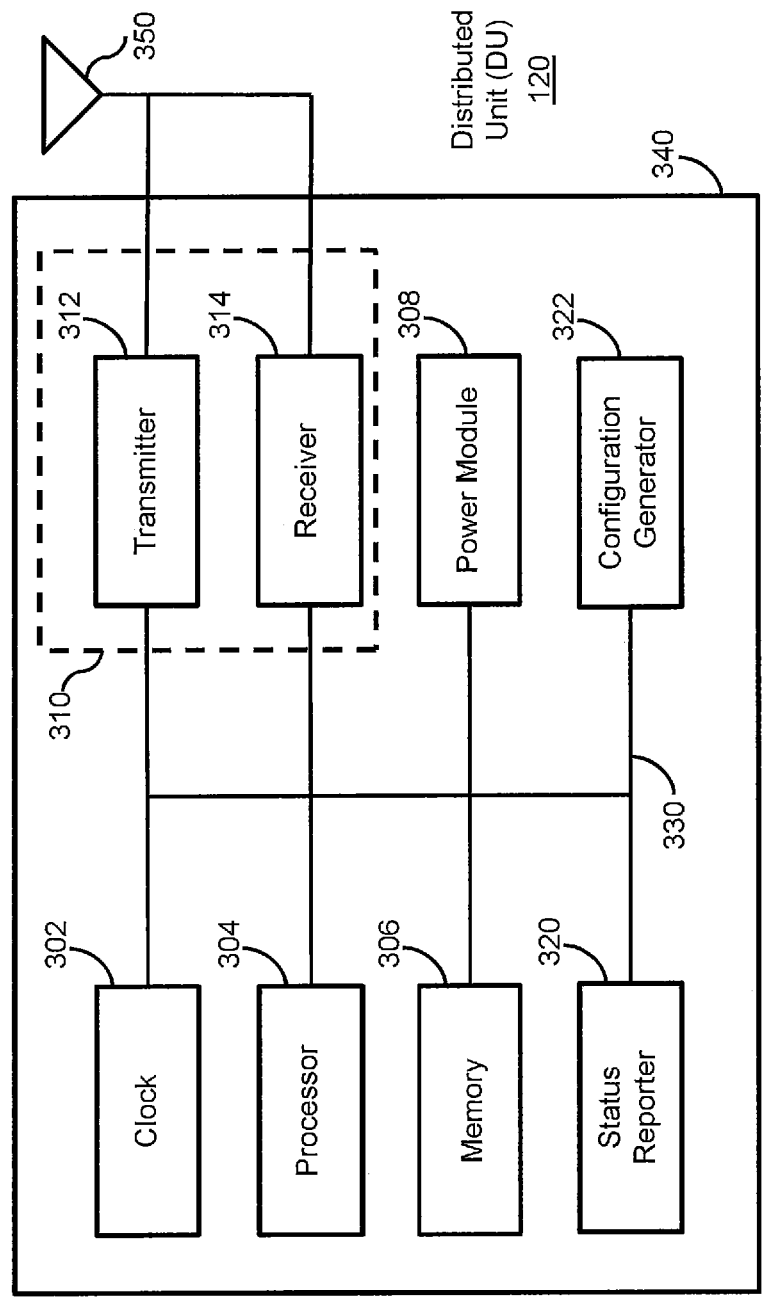
FIG. 3 illustrates an exemplary block diagram of a distributed unit (DU), in accordance with some embodiments of the present disclosure.

FIG. 3 illustrates an exemplary block diagram of a DU 120, in accordance with some embodiments of the present disclosure. The DU 120 is an example of a device that can be configured to implement the various methods described herein. As shown in FIG. 3, the DU 120 includes a housing 340 containing: a system clock 302, a processor 304, a memory 306, a transceiver 310 comprising a transmitter 312 and a receiver 314, a power module 308, a status reporter 320, and a configuration generator 322.

In this embodiment, the system clock 302 provides the timing signals to the processor 304 for controlling the timing of all operations of the DU 120. The processor 304 controls the general operation of the DU 120 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 306, which can include both read-only memory (ROM) and random access memory (RAM), can provide instructions and data to the processor 304. A portion of the memory 306 can also include non-volatile random access memory (NVRAM). The processor 304 typically performs logical and arithmetic operations based on program instructions stored within the memory 306. The instructions (a.k.a., software) stored in the memory 306 can be executed by the processor 304 to perform the methods described herein. The processor 304 and memory 306 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 310, which includes the transmitter 312 and receiver 314, allows the DU 120 to transmit and receive data to and from a remote device (e.g., a CU). In one embodiment, an antenna 350 may be attached to the housing 340 and electrically coupled to the transceiver 310. In various embodiments, the DU 120 includes (not shown) multiple transmitters, multiple receivers, multiple transceivers, and/or multiple antennas. The transmitter 312 can be configured to wirelessly transmit packets having different packet types or functions, such packets being generated by the processor 304. Similarly, the receiver 314 is configured to receive packets having different packet types or functions, and the processor 304 is configured to process packets of a plurality of different packet types. For example, the processor 304 can be configured to determine the type of packet and to process the packet and/or fields of the packet accordingly. In another embodiment, the DU 120 may communicate with a CU via fiber-optic communication, such that the transmitter 312 and the receiver 314 can be configured to transmit and receive signals respectively through an optical fiber.

The configuration generator 322 may generate a message that comprises configuration information associated with the DU 120. The configuration generator 322 may send the message to the transmitter 312, and instruct the transmitter 312 to transmit the message to the CU 110 associated with the DU, where the CU 110 and the DU 120 can cooperate to serve one or more cells in a wireless network as a base station. While the transmitter 312 can transmit the message to the CU through transport layer, the DU 120 and the CU 110 need to establish a fronthaul interface (referred as F1 interface herein) at application layer by exchanging application protocol (AP) messages. As such, the message that comprises configuration information associated with the DU 120 can be used as an F1 interface setup request message for the DU 120 to request a setup of an F1 interface between the DU 120 and the CU 110.

In one embodiment, the configuration information in the F1 interface setup request message includes configuration information of the DU 120 that the CU 110 needs to know to establish the interface. In addition, to establish the interface between the DU 120 and the CU 110, the DU 120 also needs to know configuration information of the CU 110.

The receiver 314 may receive either an F1 interface setup response message or an F1 interface setup failure message from the CU 110. The F1 interface setup response message comprises configuration information associated with the CU 110. The F1 interface setup response message also indicates that the CU 110 has obtained the configuration information of the DU 120, and agrees to establish the F1 interface between the DU 120 and the CU 110. After receiving the F1 interface setup response message and obtaining the configuration information associated with the CU 110, the DU 120 successfully establishes an F1 interface with the CU 110. In one embodiment, after receiving the F1 interface setup response message and obtaining the configuration information associated with the CU 110, the DU 120 may send a confirmation message to the CU 110 to confirm that the F1 interface is established.

The F1 interface setup failure message indicates a failure of exchanging configuration information between the DU 120 and the CU 110, i.e. indicates a failure of establishing the F1 interface between the DU 120 and the CU 110. In one embodiment, the F1 interface setup failure message comprises a reason for the failure. After receiving the F1 interface setup failure message from the CU 110, the DU 120 may wait for a certain period of time, and then re-send the F1 interface setup request message to the CU 110 for F1 interface setup.

After the F1 interface is established, the CU 110 and the DU 120 can communicate based on the exchanged configuration information of each other. From time to time, one of the CU 110 and the DU 120 may want to or need to update its configuration information. In this case, the updated configuration information should be exchanged and agreed between the CU 110 and the DU 120, before the updated configuration information can be used on the F1 interface.

In one embodiment, the configuration generator 322 is further configured to generate a DU configuration update request message that comprises updated configuration information associated with the DU 120. The configuration generator 322 may send the DU configuration update request message to the transmitter 312, and instruct the transmitter 312 to transmit the message to the CU 110. The DU configuration update request message can be used for requesting an update of the DU configuration to be used on the F1 interface between the DU 120 and the CU 110. That is, the DU 120 proposes to use the updated DU configuration on the F1 interface between the DU 120 and the CU 110, e.g. starting from a next time slot or time frame, and asks whether the CU 110 agrees. In one embodiment, the DU configuration update request message may include only the modified DU configuration, but not include the unmodified DU configuration.

The receiver 314 may receive either a DU configuration update confirmation message or a DU configuration update failure message from the CU 110. The DU configuration update confirmation message indicates a confirmation of the updating, i.e. indicates that the CU 110 has obtained the updated configuration information of the DU 120, and agrees to use the updated configuration information of the DU 120 on the F1 interface between the DU 120 and the CU 110, e.g. starting from a proposed timing point. After receiving the DU configuration update confirmation message from the CU 110, the DU 120 can start to use the updated configuration from the proposed timing point.

The DU configuration update failure message indicates a failure of the updating, e.g. indicates that the CU 110 has not successfully obtained the updated configuration information of the DU 120, or that the CU 110 does not agree to use the updated configuration information of the DU 120 on the F1 interface between the DU 120 and the CU 110 from the proposed timing point. In one embodiment, the DU configuration update failure message comprises a reason for the failure. After receiving the DU configuration update failure message from the CU 110, the DU 120 may wait for a certain period of time, and then re-send the DU configuration update request message to the CU 110 for updating DU configuration. In the meantime, the DU 120 and the CU 110 will still use the old DU configuration for communication via the F1 interface, before the DU configuration is updated successfully.

In one embodiment, the receiver 314 may receive a CU configuration update request message that comprises updated configuration information associated with the CU 110. The CU configuration update request message is used for the CU 110 to request an update of the CU configuration to be used on the F1 interface between the DU 120 and the CU 110. That is, the CU 110 proposes to use the updated CU configuration on the F1 interface between the DU 120 and the CU 110, e.g. starting from a next time slot or time frame, and asks whether the DU 120 agrees. In one embodiment, the CU configuration update request message may include only the modified CU configuration, but not include the unmodified CU configuration.

The transmitter 312 may transmit either a CU configuration update confirmation message or a CU configuration update failure message to the CU 110. The CU configuration update confirmation message indicates a confirmation of the updating, i.e. indicates that the DU 120 has obtained the updated configuration information of the CU 110, and agrees to use the updated configuration information of the CU 110 on the F1 interface between the DU 120 and the CU 110, e.g. starting from a proposed timing point. After the CU 110 receives the CU configuration update confirmation message from the DU 120, the DU 120 and the CU 110 can start to use the updated CU configuration from the proposed timing point.

The CU configuration update failure message indicates a failure of the updating, e.g. indicates that the DU 120 has not successfully obtained the updated configuration information of the CU 110, or that the DU 120 does not agree to use the updated configuration information of the CU 110 on the F1 interface between the DU 120 and the CU 110 from the proposed timing point. In one embodiment, the CU configuration update failure message comprises a reason for the failure. After the CU 110 receives the CU configuration update failure message from the DU 120, the CU 110 may wait for a certain period of time, and then re-send the CU configuration update request message to the DU 120 for updating CU configuration. In the meantime, the DU 120 and the CU 110 will still use the old CU configuration for communication via the F1 interface, before the CU configuration is updated successfully.

In a CU-DU separation scenario, one CU manages one or more DUs. So the CU needs to obtain the load information of the DUs connected to the CU. The load information can be used for RRM algorithms, such as CU load balancing, user acceptance, or handover decisions. As such, a CU monitors resource status of each DU associated with the CU; and a DU reports its resource status to the associated CU, either periodically or upon request.

In one embodiment, the receiver 314 may receive a resource status request message from the CU 110. The resource status request message is sent by the CU 110 for requesting resource status information related to the one or more cells associated with the DU 120. The status reporter 320 in this example can generate a resource status update message that comprises at least some of the resource status information requested by the CU 110. The status reporter 320 may then instruct the transmitter 312 to transmit the resource status update message to the CU 110.

The CU 110 may request resource status of multiple measurement objects in multiple cells associated with the DU 120. In one situation, the DU 120 encounters a measurement failure in some of the measurement objects or some of the cells. In this situation, the transmitter 312 may transmit, to the CU 110, a resource status response message that indicates a measurement failure of resource status information in these measurement objects or cells. The resource status response message may comprise the failure reasons. In another situation, the DU 120 encounters a measurement failure in all of the measurement objects of all cells. In this situation, the transmitter 312 may transmit, to the CU 110, a resource status failure message that indicates a measurement failure of resource status information in all measurement objects of all cells. The resource status failure message may comprise the failure reasons. In one embodiment, the resource status response message and the resource status failure message may be generated by the status reporter 320 as well.

The power module 308 can include a power source such as one or more batteries, and a power regulator, to provide regulated power to each of the above-described modules in FIG. 3. In some embodiments, if the DU 120 is coupled to a dedicated external power source (e.g., a wall electrical outlet), the power module 308 can include a transformer and a power regulator.

The various modules discussed above are coupled together by a bus system 330. The bus system 330 can include a data bus and, for example, a power bus, a control signal bus, and/or a status signal bus in addition to the data bus. It is understood that the modules of the DU 120 can be operatively coupled to one another using any suitable techniques and mediums.

Although a number of separate modules or components are illustrated in FIG. 3, persons of ordinary skill in the art will understand that one or more of the modules can be combined or commonly implemented. For example, the processor 304 can implement not only the functionality described above with respect to the processor 304, but also implement the functionality described above with respect to the status reporter 320. Conversely, each of the modules illustrated in FIG. 3 can be implemented using a plurality of separate components or elements.

Figure 4:
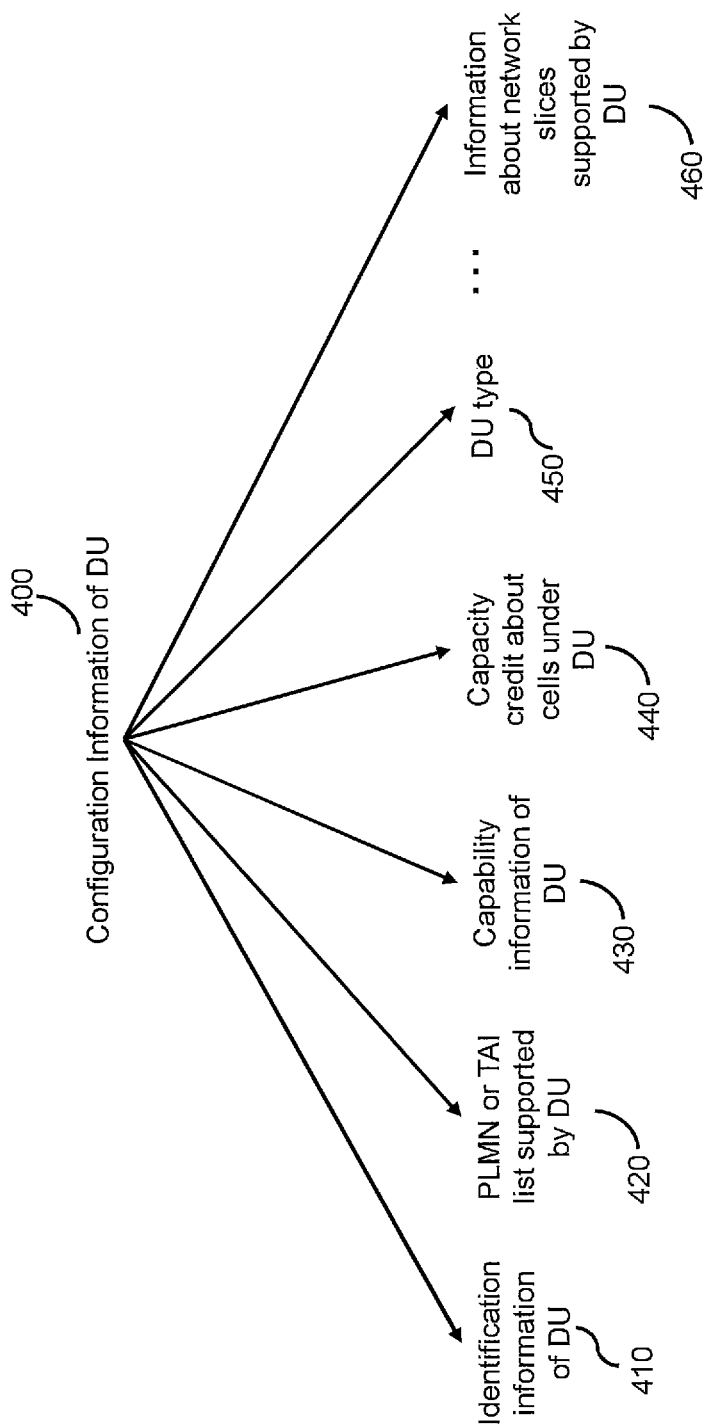
FIG. 4 illustrates exemplary configuration information of a DU, in accordance with some embodiments of the present disclosure.

FIG. 4 illustrates exemplary configuration information of a DU, in accordance with some embodiments of the present disclosure. As shown in FIG. 4, the exemplary DU configuration information 400 comprises: DU identification information 410; a list 420 of public land mobile networks (PLMNs) or tracking area identities (TAIs) supported by DU; DU capability information 430; capacity credit information 440 of the one or more cells associated with the DU or capacity credit information of the DU; DU type 450; and network slice information 460 about network slices supported by the DU, per each PLMN or per each TAI.

In one embodiment, the DU identification information 410 can be used for a CU to identify and manage a connected DU, and may be carried by an ID flag or other ID information, such as the transmission channel between CU and DU. In addition, DU related operation and management information may be collected and reported. For example, alarm information and KPI (key performance indicator) information can be reported per DU to the OAM (operations and management).

In one embodiment, the DU capacity information 430 includes DU protocol version, maximum number of cells that can be established and supported by DU (related to cell capacity), band and bandwidth supported by DU, number of antennas (uplink and downlink), maximum downlink transmit power, etc.

In one embodiment, the DU's CE traffic (Capacity Credit) 440 includes uplink and downlink capacity credit corresponding to a single cell or multiple cells under DU. The DU Type 450 may indicate a type of air interface that DU supports, such as E-UTRA (Evolved Universal Terrestrial Radio Access) or NR (New Radio).

It can be understood that during F1 interface setup, a DU's configuration information may include one or more of the listed DU configuration information in FIG. 4.

It can also be understood that a DU configuration update request message may include only the modified DU configuration, but not include the unmodified DU configuration. For example, when the DU modifies the capability information 430, the DU may send the modified capability information in the DU configuration update request message to the CU, without sending other unmodified configuration information listed in FIG. 4.

It can also be understood that while a DU configuration update request message may include same type of information as an F1 interface setup request message, the CU can distinguish the two messages based on message type information carried by the two messages.

Figure 5:
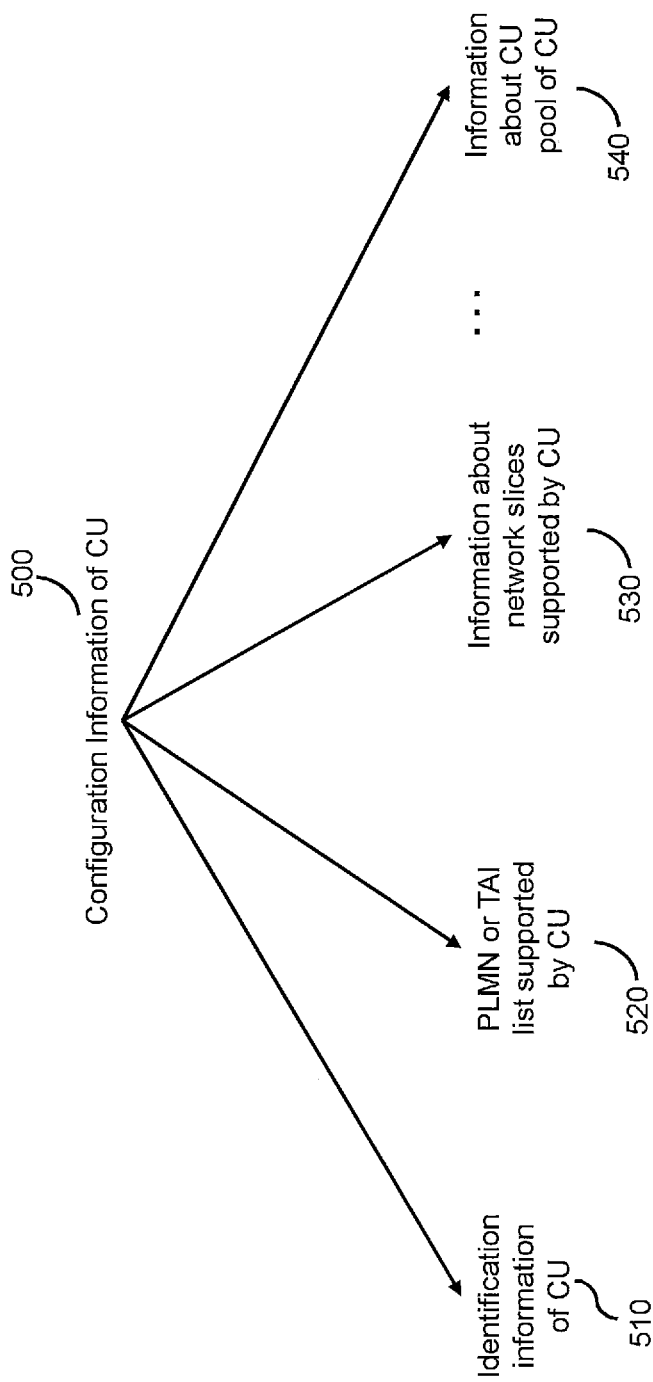
FIG. 5 illustrates exemplary configuration information of a CU, in accordance with some embodiments of the present disclosure.

FIG. 5 illustrates exemplary configuration information of a CU, in accordance with some embodiments of the present disclosure. As shown in FIG. 5, the exemplary CU configuration information 500 comprises: CU identification information 510; a list 520 of public land mobile networks (PLMNs) or tracking area identities (TAIs) supported by CU; network slice information 530 about network slices supported by the CU, per each PLMN or per each TAI; and CU POOL information 540 about a pool that CU belongs to.

In one embodiment, the CU identification information 510 is a unique identifier for identifying CU, which can be equivalent to the global 5G base station ID, or it can be an independent ID.

In one embodiment, if the system supports CU POOL, an F1 interface setup response message may include CU POOL information, such as CU GROUP ID, corresponding PLMN ID, and corresponding CU ID information. Optionally, the CU POOL information contains the relative capacity information of the CU at POOL.

It can be understood that during F1 interface setup, a CU's configuration information may include one or more of the listed CU configuration information in FIG. 5.

It can also be understood that a CU configuration update request message may include only the modified CU configuration, but not include the unmodified CU configuration. For example, when the CU modifies the network slice information 530, the CU may send the modified network slice information in the CU configuration update request message to the DU, without sending other unmodified configuration information listed in FIG. 5.

It can also be understood that while a CU configuration update request message may include same type of information as an F1 interface setup response message, the DU can distinguish the two messages based on message type information carried by the two messages.

Figure 6:
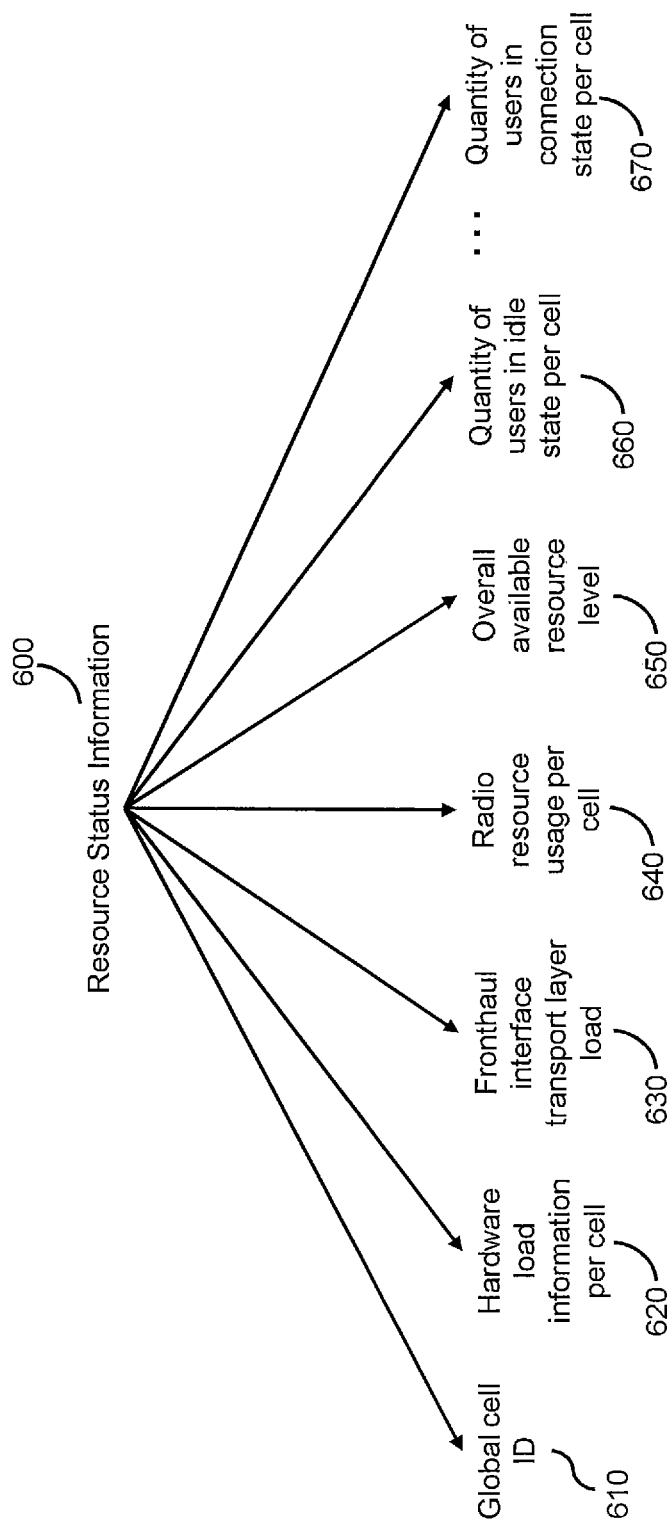
FIG. 6 illustrates exemplary resource status information reported by a DU, in accordance with some embodiments of the present disclosure.

FIG. 6 illustrates exemplary resource status information 600 reported by a DU, in accordance with some embodiments of the present disclosure. As shown in FIG. 6, the exemplary resource status information 600 comprises: a global cell ID 610 of each cell related to the resource status information; hardware load information 620 in cell of the one or more cells; status 630 of the F1 interface transport network load experienced by the one or more cells; radio resource usage 640 per cell; overall available resource level in the one or more cells in downlink and uplink; a first quantity 660 of current users in idle state in each of the one or more cells; and a second quantity 670 of current users in connection state in each of the one or more cells. In one embodiment, the radio resource usage 640 comprises at least one of: physical resource block (PRB) usage in a guaranteed bit rate (GBR) service, PBR usage in a non-GBR service, and total PRB usage.

Figure 7:
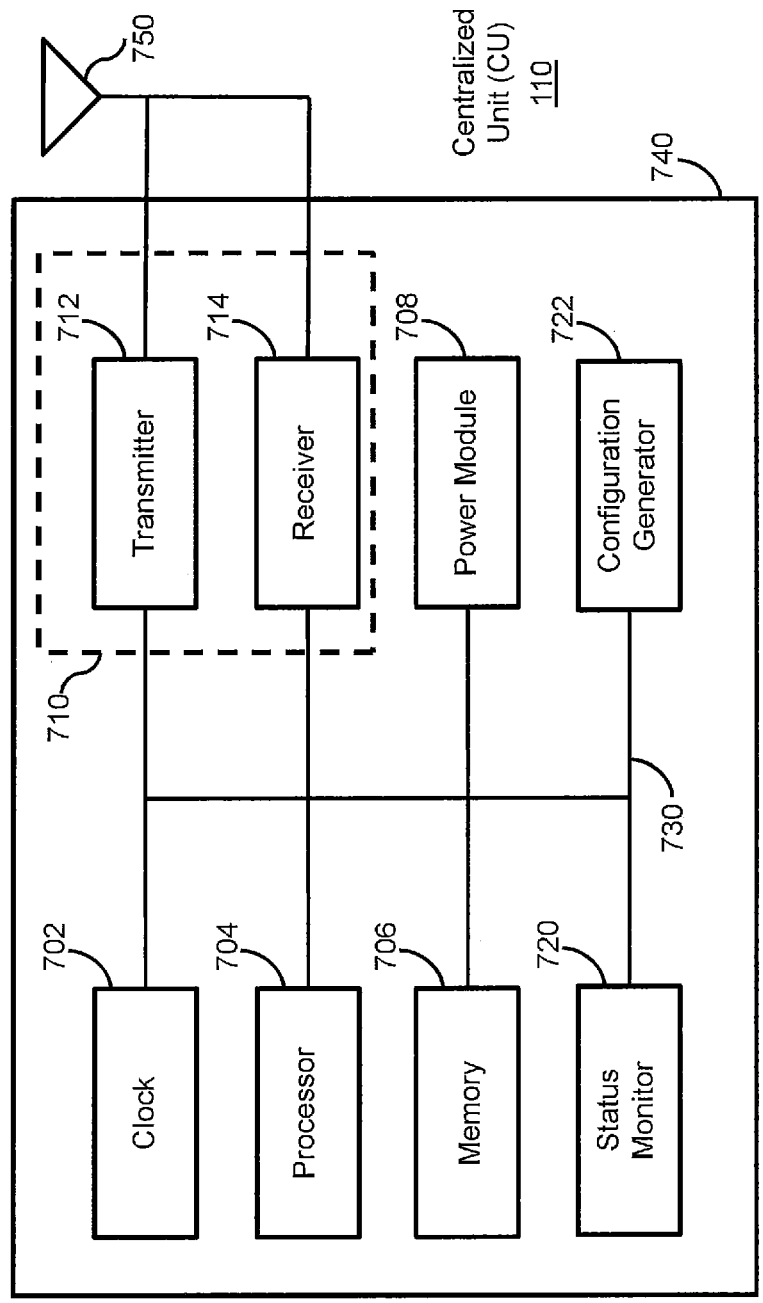
FIG. 7 illustrates an exemplary block diagram of a centralized unit (CU), in accordance with some embodiments of the present disclosure.

FIG. 7 illustrates an exemplary block diagram of a CU 110, in accordance with some embodiments of the present disclosure. The CU 110 is an example of a device that can be configured to implement the various methods described herein. As shown in FIG. 7, the CU 110 includes a housing 740 containing: a system clock 702, a processor 704, a memory 706, a transceiver 710 comprising a transmitter 712 and receiver 714, a power module 708, a status monitor 720, and a configuration generator 722.

In this embodiment, the system clock 702, the processor 704, the memory 706, the transceiver 710 and the power module 708 work similarly to the system clock 302, the processor 304, the memory 306, the transceiver 310 and the power module 308 in the DU 120.

In one embodiment, an antenna 750 may be attached to the housing 740 and electrically coupled to the transceiver 710. In various embodiments, the CU 110 includes (not shown) multiple transmitters, multiple receivers, multiple transceivers, and/or multiple antennas. In another embodiment, the CU 110 may communicate with one or more DUs connected to the CU via fiber-optic communication, such that the transmitter 712 and the receiver 714 can be configured to transmit and receive signals respectively through an optical fiber.

In one embodiment, the receiver 714 may receive a message that comprises configuration information associated with the DU 120. In one embodiment, the message is an F1 interface setup request message for the DU 120 to request a setup of an F1 interface between the DU 120 and the CU 110. In addition, to establish the interface between the DU 120 and the CU 110, the DU 120 also needs to know configuration information of the CU 110.

After receiving the F1 interface setup request message, the configuration generator 722 may generate either an F1 interface setup response message or an F1 interface setup failure message, and instruct the transmitter 712 to transmit the generated message to the DU 120. The F1 interface setup response message comprises configuration information associated with the CU 110. The F1 interface setup response message also indicates that the CU 110 has obtained the configuration information of the DU 120, and agrees to establish the F1 interface between the DU 120 and the CU 110.

The F1 interface setup failure message indicates a failure of exchanging configuration information between the DU 120 and the CU 110, i.e. indicates a failure of establishing the F1 interface between the DU 120 and the CU 110. In one embodiment, the F1 interface setup failure message comprises a reason for the failure.

After the F1 interface is established, the CU 110 and the DU 120 can communicate based on the exchanged configuration information of each other. From time to time, one of the CU 110 and the DU 120 may want to or need to update its configuration information. In this case, the updated configuration information should be exchanged and agreed between the CU 110 and the DU 120, before the updated configuration information can be used on the F1 interface.

In one embodiment, the configuration generator 722 is further configured to generate a CU configuration update request message that comprises updated configuration information associated with the CU 110. The configuration generator 722 may send the CU configuration update request message to the transmitter 712, and instruct the transmitter 712 to transmit the message to the DU 120. The CU configuration update request message can be used for requesting an update of the CU configuration to be used on the F1 interface between the DU 120 and the CU 110. That is, the CU 110 proposes to use the updated CU configuration on the F1 interface between the DU 120 and the CU 110, e.g. starting from a next time slot or time frame, and asks whether the DU 120 agrees. In one embodiment, the CU configuration update request message may include only the modified CU configuration information, but not include the unmodified CU configuration information.

The receiver 714 may receive either a CU configuration update confirmation message or a CU configuration update failure message from the DU 120. The CU configuration update confirmation message indicates a confirmation of the updating, i.e. indicates that the DU 120 has obtained the updated configuration information of the CU 110, and agrees to use the updated configuration information of the CU 110 on the F1 interface between the DU 120 and the CU 110, e.g. starting from a proposed timing point. After receiving the CU configuration update confirmation message from the DU 120, the CU 110 can start to use the updated configuration from the proposed timing point.

The CU configuration update failure message indicates a failure of the updating, e.g. indicates that the DU 120 has not successfully obtained the updated configuration information of the CU 110, or that the DU 120 does not agree to use the updated configuration information of the CU 110 on the F1 interface between the DU 120 and the CU 110 from the proposed timing point. In one embodiment, the CU configuration update failure message comprises a reason for the failure. After receiving the CU configuration update failure message from the DU 120, the CU 110 may wait for a certain period of time, and then re-send the CU configuration update request message to the DU 120 for updating CU configuration. In the meantime, the DU 120 and the CU 110 will still use the old CU configuration for communication via the F1 interface, before the CU configuration is updated successfully.

In one embodiment, the receiver 714 may receive a DU configuration update request message that comprises updated configuration information associated with the DU 120. The DU configuration update request message is used for the DU 120 to request an update of the DU configuration to be used on the F1 interface between the DU 120 and the CU 110. That is, the DU 120 proposes to use the updated DU configuration on the F1 interface between the DU 120 and the CU 110, e.g. starting from a next time slot or time frame, and asks whether the CU 110 agrees. In one embodiment, the DU configuration update request message may include only the modified DU configuration, but not include the unmodified DU configuration.

The transmitter 712 may transmit either a DU configuration update confirmation message or a DU configuration update failure message to the DU 120. The DU configuration update confirmation message indicates a confirmation of the updating, i.e. indicates that the CU 110 has obtained the updated configuration information of the DU 120, and agrees to use the updated configuration information of the DU 120 on the F1 interface between the DU 120 and the CU 110, e.g. starting from a proposed timing point. After the DU 120 receives the DU configuration update confirmation message from the CU 110, the DU 120 and the CU 110 can start to use the updated DU configuration from the proposed timing point.

The DU configuration update failure message indicates a failure of the updating, e.g. indicates that the CU 110 has not successfully obtained the updated configuration information of the DU 120, or that the CU 110 does not agree to use the updated configuration information of the DU 120 on the F1 interface between the DU 120 and the CU 110 from the proposed timing point. In one embodiment, the DU configuration update failure message comprises a reason for the failure. After the DU 120 receives the DU configuration update failure message from the CU 110, the DU 120 may wait for a certain period of time, and then re-send the DU configuration update request message to the CU 110 for updating DU configuration. In the meantime, the DU 120 and the CU 110 will still use the old DU configuration for communication via the F1 interface, before the DU configuration is updated successfully.

In a CU-DU separation scenario, one CU manages one or more DUs. So the CU needs to obtain the load information of the DUs connected to the CU. The load information can be used for RRM algorithms, such as CU load balancing, user acceptance, or handover decisions. As such, a CU monitors resource status of each DU associated with the CU; and a DU reports its resource status to the associated CU, either periodically or upon request.

In one embodiment, the status monitor 720 may generate a resource status request message for requesting resource status information related to the one or more cells associated with the DU 120. The status monitor 720 may instruct the transmitter 712 to transmit the resource status request message to the DU 120.

The receiver 714 in this example can receive a resource status update message from the DU 120. The resource status update message comprises at least some of the resource status information requested by the CU 110.

The CU 110 may request resource status of multiple measurement objects in multiple cells associated with the DU 120. In one situation, the DU 120 encounters a measurement failure in some of the measurement objects or some of the cells. In this situation, the receiver 714 may receive, from the DU 120, a resource status response message that indicates a measurement failure of resource status information in these measurement objects or cells. The resource status response message may comprise the failure reasons. In another situation, the DU 120 encounters a measurement failure in all of the measurement objects of all cells. In this situation, the receiver 714 may receive, from the DU 120, a resource status failure message that indicates a measurement failure of resource status information in all measurement objects of all cells. The resource status failure message may comprise the failure reasons. In one embodiment, the receiver 714 may forward the resource status response message and the resource status failure message to the status monitor 720, such that the status monitor 720 can keep monitoring the resource status related to the DU 120.

The various modules discussed above are coupled together by a bus system 730. The bus system 730 can include a data bus and, for example, a power bus, a control signal bus, and/or a status signal bus in addition to the data bus. It is understood that the modules of the CU 110 can be operatively coupled to one another using any suitable techniques and mediums.

Although a number of separate modules or components are illustrated in FIG. 7, persons of ordinary skill in the art will understand that one or more of the modules can be combined or commonly implemented. For example, the processor 704 can implement not only the functionality described above with respect to the processor 704, but also implement the functionality described above with respect to the status monitor 720. Conversely, each of the modules illustrated in FIG. 7 can be implemented using a plurality of separate components or elements.

Figure 8:
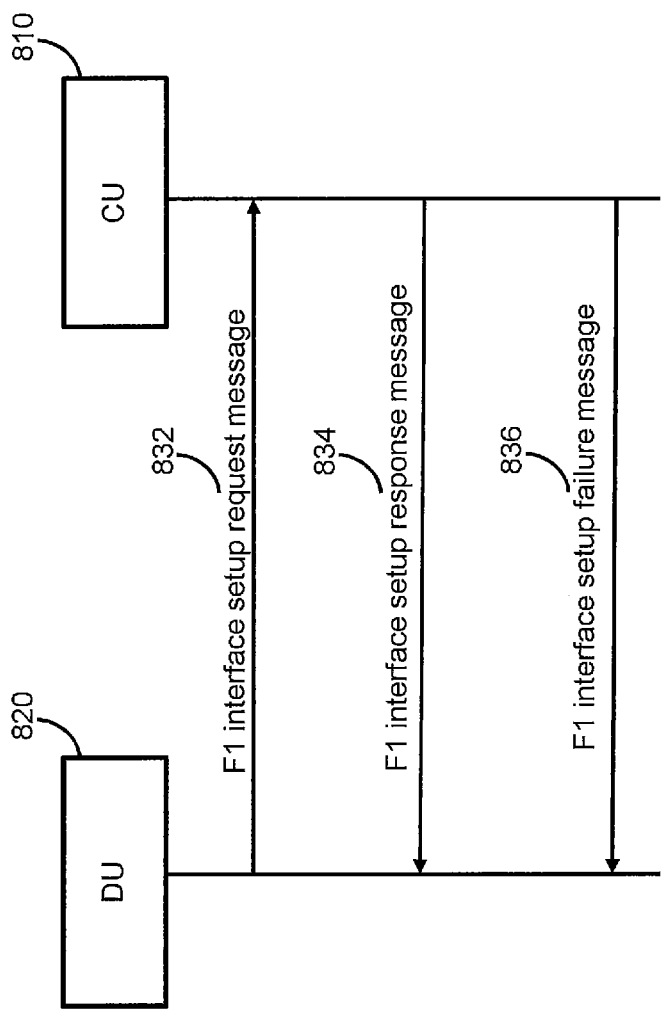
FIG. 8 illustrates an exemplary method for an interface setup between DU and CU, in accordance with some embodiments of the present disclosure.

FIG. 8 illustrates an exemplary method for an interface setup between DU and CU, in accordance with some embodiments of the present disclosure. In one embodiment, the CU 810 may have a structure as shown in FIG. 3; and the DU 820 may have a structure as shown in FIG. 7. As shown in FIG. 8, at step 832, the DU 820 sends an F1 interface setup request message to the CU 810 for establishing an F1 interface with the CU 810. The CU 810 may either send an F1 interface setup response message at step 834 or send an F1 interface setup failure message at step 836. The F1 interface setup response message comprises configuration information associated with the CU 810 and indicates that: the CU 810 has obtained the configuration information of the DU 820 and agrees to establish the F1 interface between the DU 820 and the CU 810. The F1 interface setup failure message indicates a failure of exchanging configuration information between the DU 820 and the CU 810, i.e. indicates a failure of establishing the F1 interface between the DU 820 and the CU 810. In one embodiment, the F1 interface setup failure message comprises: (a) CU ID: a unique identifier for identifying CU, which can be equivalent to the global 5G base station ID, or it can be an independent ID; and (b) causes of the failure.

It can be understood that, although typically an interface setup request is sent from a lower layer node to a higher layer node, e.g. from DU to CU here, the disclosed method and system are applicable similarly to a situation when the interface setup request is sent from a higher layer node to a lower layer node, e.g. from CU to DU.

Figure 9:
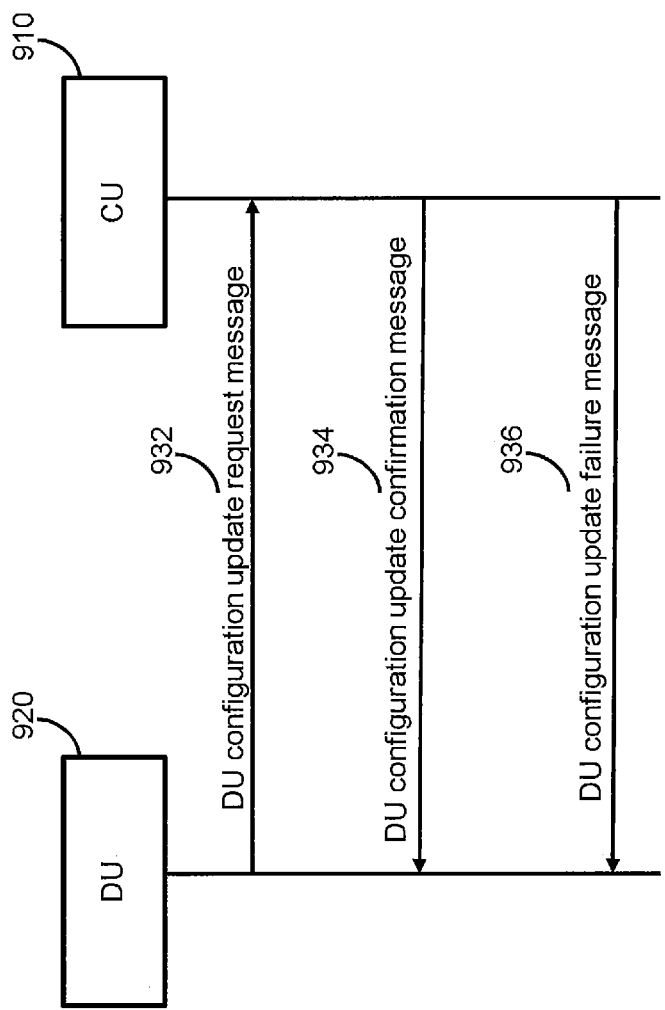
FIG. 9 illustrates an exemplary method for updating DU configuration between CU and DU, in accordance with some embodiments of the present disclosure.

FIG. 9 illustrates an exemplary method for updating DU configuration between CU and DU, in accordance with some embodiments of the present disclosure. In one embodiment, the CU 910 may have a structure as shown in FIG. 3; and the DU 920 may have a structure as shown in FIG. 7. As shown in FIG. 9, at step 932, the DU 920 sends a DU configuration update request message to the CU 910 for requesting to use updated DU configuration on the established F1 interface with the CU 910. The DU configuration update request message comprises what is updated in the information carried previously in the F1 interface setup request message. The CU 910 may either send a DU configuration update confirmation message at step 934 or send a DU configuration update failure message at step 936. The DU configuration update confirmation message indicates a confirmation of the updating, i.e. indicates that the CU 910 has obtained the updated configuration information of the DU 920, and agrees to use the updated configuration information of the DU 920 on the F1 interface between the DU 920 and the CU 910, e.g. starting from a proposed timing point. The DU configuration update failure message indicates a failure of the updating, e.g. indicates that the CU 910 has not successfully obtained the updated configuration information of the DU 920, or that the CU 910 does not agree to use the updated configuration information of the DU 920 on the F1 interface between the DU 920 and the CU 910 from the proposed timing point. In one embodiment, the DU configuration update failure message comprises a reason for the failure.

Figure 10:
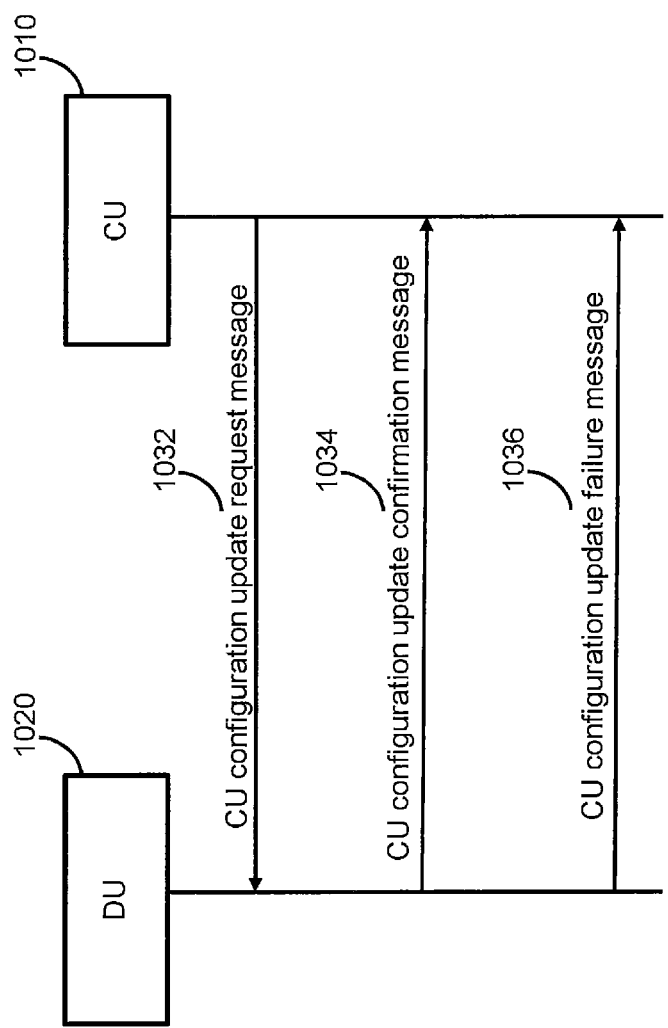
FIG. 10 illustrates an exemplary method for updating CU configuration between CU and DU, in accordance with some embodiments of the present disclosure.

FIG. 10 illustrates an exemplary method for updating CU configuration between CU and DU, in accordance with some embodiments of the present disclosure. In one embodiment, the CU 1010 may have a structure as shown in FIG. 3; and the DU 1020 may have a structure as shown in FIG. 7. As shown in FIG. 10, at step 1032, the CU 1010 sends a CU configuration update request message to the DU 1020 for requesting to use updated CU configuration on the established F1 interface with the DU 1020. The CU configuration update request message comprises what is updated in the information carried previously in the F1 interface setup response message. The DU 1020 may either send a CU configuration update confirmation message at step 1034 or send a CU configuration update failure message at step 1036. The CU configuration update confirmation message indicates a confirmation of the updating, i.e. indicates that the DU 1020 has obtained the updated configuration information of the CU 1010, and agrees to use the updated configuration information of the CU 1010 on the F1 interface between the CU 1010 and the DU 1020, e.g. starting from a proposed timing point. The CU configuration update failure message indicates a failure of the updating, e.g. indicates that the DU 1020 has not successfully obtained the updated configuration information of the CU 1010, or that the DU 1020 does not agree to use the updated configuration information of the CU 1010 on the F1 interface between the CU 1010 and the DU 1020 from the proposed timing point. In one embodiment, the CU configuration update failure message comprises a reason for the failure.

Figure 11:
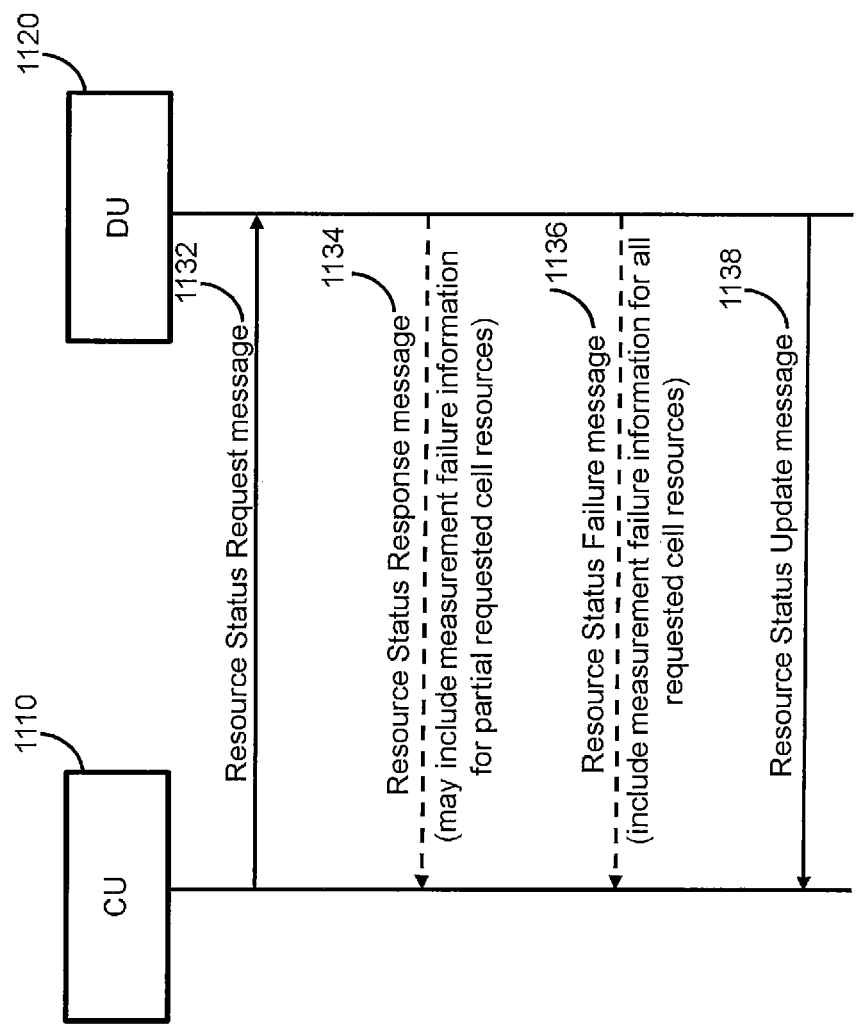
FIG. 11 illustrates an exemplary method for reporting and monitoring DU resource status, in accordance with some embodiments of the present disclosure.

FIG. 11 illustrates an exemplary method for reporting and monitoring DU resource status, in accordance with some embodiments of the present disclosure. In one embodiment, the CU 1110 may have a structure as shown in FIG. 3; and the DU 1120 may have a structure as shown in FIG. 7. As shown in FIG. 11, at step 1132, the CU 1110 sends a resource status request message to the DU 1120 for requesting updated resource status under the DU 1120. The DU 1120 may, optionally, either send a resource status response message at step 1134 to the CU 1110, or send a resource status failure message at step 1136 to the CU 1110. The resource status response message indicates a measurement failure of resource status information in some measurement objects or cells. The resource status response message may comprise measurement failure information for the failed parts of requested cell resources. The resource status failure message indicates a measurement failure of resource status information in all measurement objects of all cells. The resource status failure message may comprise measurement failure information for all requested cell resources. Based on the request type, the cell list information, the resource report measurement objects, and the resource report measurement configuration in the resource status request message, the DU 1120 sends at least some of the requested resource status information of the one or more cells under the DU 1120 to the CU 1110 as a feedback, via a resource status update message. As shown in FIG. 11, if there is some updated resource status without measurement failure, the DU 1120 sends, at step 1138, a resource status update message to the CU 1110. The resource status update message comprises at least some of the resource status information requested by the CU 1110.

In addition, for a CU-DU separation of an evolved LTE base station, i.e., supporting simultaneous connection to the Evolved Packet Core (EPC) and the Next Generation Core (NGC), there is a need to distinguish types of measurement objects. In this case, there are two types of reported load information: load information of LTE and load information of NR.

Further, in a scenario of multiple shared PLMNs, the CU may consider sending the measurement configuration according to the different PLMNs when the measurement request is issued. Alternatively, the DU can report the status of resources according to different PLMNs.

Further, in a scenario of network slicing, the CU can also report the corresponding load information, in accordance with different Network Slice Selection Assistance Information (NSSAI) requirements.

Further, in a CU-DU separation scenario, the wireless system can utilize CE (Capacity Credit) to realize resource usage report of one or more cells under the DU. This includes information report of current uplink/downlink Capacity Credit in one or more cells under the DU, which can be reported periodically by DU, or reported in real-time based on the CU request. The Capacity Credit information can help the CU to learn the resource configuration and utilization status on the DU when new calls come in.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method implemented on a distributed unit (DU), the method comprising:
    generating a first message that comprises first configuration information associated with the DU; and
    transmitting the first message to a centralized unit (CU) for exchanging configuration information with the CU, wherein the DU and the CU cooperate to serve at least one cell in a wireless network as a same base station, wherein the first configuration information comprises:
        identification information of the DU for the CU to identify the DU;
        a list of public land mobile networks or tracking area identities supported by the DU;
        a protocol version of the DU; and
        information about network slices supported by the DU per each tracking area identity.

2. The method of claim 1, further comprising:
    generating an update request message that comprises updated configuration information associated with the DU;
    transmitting the update request message to the CU for updating the first configuration information associated with the DU; and
    receiving a second message or a third message from the CU, wherein:
        the second message indicates a confirmation of the updating, and
        the third message indicates a failure of the updating.

3. The method of claim 1, further comprising receiving a second message or a third message from the CU, wherein:
    the second message comprises second configuration information associated with the CU;
    the second configuration information comprises a list of public land mobile networks supported by the CU; and
    the third message indicates a failure of the exchanging of configuration information.

4. A method implemented on a centralized unit (CU), the method comprising:
    receiving a first message from a distributed unit (DU) for exchanging configuration information with the DU, wherein the first message comprises first configuration information associated with the DU, and wherein the CU and the DU cooperate to serve at least one cell in a wireless network as a same base station, and wherein the first configuration information comprises:
        identification information of the DU for the CU to identify the DU;
        a list of public land mobile networks or tracking area identities supported by the DU;
        a protocol version of the DU; and
        information about network slices supported by the DU per each tracking area identity.

5. The method of claim 4, further comprising:
    receiving an update request message from the DU for updating the first configuration information associated with the DU, wherein the update request message comprises updated configuration information associated with the DU; and
    transmitting a second message or a third message to the DU, wherein:
        the second message indicates a confirmation of the updating, and
        the third message indicates a failure of the updating.

6. The method of claim 4, further comprising transmitting a second message or a third message to the DU, wherein:
    the second message comprises second configuration information associated with the CU;
    the second configuration information comprises a list of public land mobile networks supported by the CU; and
    the third message indicates a failure of the exchanging of configuration information.

7. A distributed unit (DU), comprising:
    a transmitter configured to transmit a first message comprising first configuration information to a centralized unit (CU) for exchanging configuration information with the CU, wherein the DU and the CU cooperate to serve at least one cell in a wireless network as a same base station, wherein the first configuration information comprises:

identification information of the DU for the CU to identify the DU;

a list of public land mobile networks or tracking area identities supported by the DU;

a protocol version of the DU; and information about network slices supported by the DU per each tracking area identity.

8. A centralized unit (CU), comprising:

a receiver configured to receive a first message from a distributed unit (DU) for exchanging configuration information with the DU, wherein the first message comprises first configuration information associated with the DU, and wherein the CU and the DU cooperate to serve at least one cell in a wireless network as a same base station, and wherein the first configuration information comprises:

identification information of the DU for the CU to identify the DU;

a list of public land mobile networks or tracking area identities supported by the DU;

a protocol version of the DU; and information about network slices supported by the DU per each tracking area identity.

* * * * *